United States Patent
Shiino et al.

(10) Patent No.: US 6,711,482 B2
(45) Date of Patent: Mar. 23, 2004

(54) VEHICULAR SUSPENSION RIGIDITY CONTROLLING APPARATUS AND METHOD WITH ROLL-OVER PREVENTIVE FEATURE

(75) Inventors: Kohtaro Shiino, Kanagawa (JP); Fumiyuki Yamaoka, Kanagawa (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/421,848

(22) Filed: Apr. 24, 2003

(65) Prior Publication Data

US 2003/0204293 A1 Oct. 30, 2003

(30) Foreign Application Priority Data

Apr. 30, 2002 (JP) .......................... 2002-128586

(51) Int. Cl.$^7$ ................................. B60G 3/00
(52) U.S. Cl. .............. 701/37; 701/38; 701/91; 280/5.5; 280/5.502
(58) Field of Search ............... 701/37, 38, 91; 280/5.5, 5.02, 5.504, 5.506, 5.507, 5.515; 180/209

(56) References Cited

U.S. PATENT DOCUMENTS

| | | | |
|---|---|---|---|
| 5,904,218 A | * | 5/1999 | Watkins ................. 180/209 |
| 6,092,011 A | | 7/2000 | Hiramoto |
| 6,357,769 B1 | * | 3/2002 | Omundson et al. ... 280/124.109 |
| 6,584,710 B1 | * | 7/2003 | Lin et al. .................. 37/348 |
| 6,633,804 B2 | * | 10/2003 | Dix et al. .................. 701/50 |
| 6,634,445 B2 | * | 10/2003 | Dix et al. ................. 180/6.48 |

FOREIGN PATENT DOCUMENTS

JP  9-323521 A  12/1997

* cited by examiner

Primary Examiner—William A. Cuchlinski, Jr.
Assistant Examiner—Olge Hernandez
(74) Attorney, Agent, or Firm—Foley & Lardner

(57) ABSTRACT

In vehicular suspension rigidity controlling apparatus and method, a plurality of suspensions intervened between a sprung mass of a vehicle body and an unsprung mass of a corresponding road wheel, a suspension rigidity adjusting section is installed to be enabled to adjust a rigidity of each suspension, a driving state of the vehicle is detected, a predictive determination is made whether the vehicular driving state is a state in which there is a possibility that the vehicle is rolled over from the detected driving state of the vehicle, and the rigidity of at least one of the suspensions is controllably adjusted in a direction to decrease a potential energy of the sprung mass of the vehicle when predictively determining that the vehicular driving state is the state that there is the possibility that the vehicle is rolled over.

14 Claims, 10 Drawing Sheets

VEHICULAR SUSPENSION RIGIDITY CONTROLLING APPARATUS AND METHOD WITH ROLL-OVER PREVENTIVE FEATURE

BACKGROUND OF THE INVENTION

1. Field of the Invention

The present invention relates to suspension rigidity controlling apparatus and method for an automotive vehicle with a vehicular roll-over preventive feature for preventing a vehicular roll-over from occurring during a steering operation.

2. Description of the Related Art

A Japanese Patent Application First Publication No. Heisei 9-323521 published on Dec. 16, 1997 exemplifies a previously proposed vehicular roll-over preventing apparatus. In this previously proposed vehicular roll-over preventing apparatus, when detecting that a weight difference between left and right road wheels is equal to or larger than a set weight difference on the basis of a detection information from a weight detecting section and a steering state detecting section, a roll rigidity adjusting section is operated as a safety device so that a roll rigidity (stiffness) of each suspension of the vehicle is increased. Thus, a vehicular roll rigidity is suppressed. This prevents the vehicle from being rolled over.

SUMMARY OF THE INVENTION

However, since it is not possible to zero the roll of the vehicle in terms of a function that the vehicular suspension system naturally has, a dive of a vehicle body at outer (road) wheels which are one of left and right road wheels located at an outside with respect to a cornering center during a steering operation of a steering wheel of the vehicle is restricted if the roll rigidities of all vehicular suspensions are augmented at a time point at which a predetermined roll is developed due to the steering operation. Hence, when a roll angle of the vehicle is furthermore increased, a pressing force against each outer wheel which is a component force of a centrifugal force at a position of a weight center of the vehicle is decreased and a jack-up force against inner wheels (a force in a direction to lift the inner wheels in an upward direction) is varied in its increase direction. Therefore, as the roll angle of the vehicle becomes increased, a height of the weight center of the vehicle is varied in its increase direction.

As described above, when the height of the vehicular weight center under a state in which a roll moment is applied to the vehicle body is increased, the roll moment applied to the vehicle body is increased. Thus, the vehicle falls in a state in which the vehicle is easy to be rolled over. Furthermore, during a reverse steering operation to an originally steered direction, if a variation width of the roll angle becomes large due to a sway-back of a vehicle body to a sway thereon, an inertia force causes the vehicle to become easier to be rolled over.

It is, therefore, an object of the present invention to provide suspension rigidity controlling apparatus and method for an automotive vehicle which can remarkably enhance a vehicular roll-over prevention effect, with the roll moment applied to the vehicle becomes decreased by controlling a rigidity of a suspension in a direction to reduce a potential energy of a sprung mass of the vehicle when the vehicle falls in a driving state in which there is a possibility that the vehicle is rolled over.

The above-described object can be achieved by providing a vehicular suspension rigidity controlling apparatus, comprising: a plurality of suspensions, each suspension being intervened between a sprung mass of a vehicle body and an unsprung mass of a corresponding road wheel; a suspension rigidity adjusting section that is enabled to adjust a rigidity of each suspension; a driving state detecting section that detects a driving state of the vehicle; a vehicular roll-over determining section that predictively determines whether the vehicular driving state is a state in which there is a possibility that the vehicle is rolled over from the detected driving state of the vehicle; and a suspension controlling section that controllably adjusts the rigidity of at least one of the suspensions via the suspension rigidity adjusting section in a direction to decrease a potential energy of the sprung mass of the vehicle when the vehicular roll-over determining section predictively determines that the vehicular driving state is the state that there is the possibility that the vehicle is rolled over.

The above-described object can also be achieved by a vehicular suspension rigidity controlling apparatus, comprising: a plurality of suspensions, each suspension being intervened between a sprung mass of a vehicle body and an unsprung mass of a corresponding road wheel; a suspension rigidity adjusting section that is enabled to adjust a rigidity of each suspension; a driving state detecting section that detects a driving state of the vehicle including at least a vehicular velocity detecting section that detects a vehicular velocity and a steering angular velocity detecting section that detects a steering angular velocity; a vehicular roll-over determining section that compares each of the detected vehicular velocity and the steering angular velocity with a corresponding one of predetermined threshold values to predictively determine whether the driving state of the vehicle is in the state in which there is a possibility that the vehicle is rolled over; and a suspension controlling section that, when the driving state of the vehicle is transferred from a first turning state to a second turning state which is reverse to the first turning state and the vehicular roll-over determining section predictively determines that the driving state of the vehicle is in the state in which there is a possibility that the vehicle is rolled over, adjustably controls rigidities of the respective suspensions via the suspension rigidity adjusting section in such a manner that one of the rigidities at at least compression stroke of the respective suspensions have been at the compression stroke during the first turning state being decreased and the rigidities at at least extension stroke of the remaining suspensions which have been at the compression stroke during the first turning state being increased is carried out to decrease a potential energy of the sprung mass of the vehicle.

The above-described object can also be achieved by providing a vehicular suspension rigidity controlling method, the vehicle comprising: a plurality of suspensions, each suspension being intervened between a sprung mass of a vehicle body and an unsprung mass of a corresponding road wheel; and a suspension rigidity adjusting section that is enabled to adjust a rigidity of each suspension, and the method comprising: detecting a driving state of the vehicle; predictively determining whether the vehicular driving state is a state in which there is a possibility that the vehicle is rolled over from the detected driving state of the vehicle; and controllably adjusting the rigidity of at least one of the suspensions in a direction to decrease a potential energy of the sprung mass of the vehicle, when predictively determining that the vehicular driving state is the state that there is the possibility that the vehicle is rolled over.

This summary of the invention does not necessarily describe all necessary features so that the invention may also be a sub-combination of these described features.

The other objects and features of the present invention will become understood from the following description with reference to the accompany drawings.

DETAILED DESCRIPTION OF THE PREFERRED EMBODIMENTS

Reference will hereinafter be made to the drawings in order to facilitate a better understanding of the present invention.

First Embodiment

FIGS. 1 through 7 show an apparatus for controlling a rigidity (or stiffness) of a suspension system for an automotive vehicle with a vehicular roll-over preventive feature (hereinafter, also referred to as a vehicular suspension rigidity controlling apparatus) in a first preferred embodiment according to the present invention.

Figure 1:
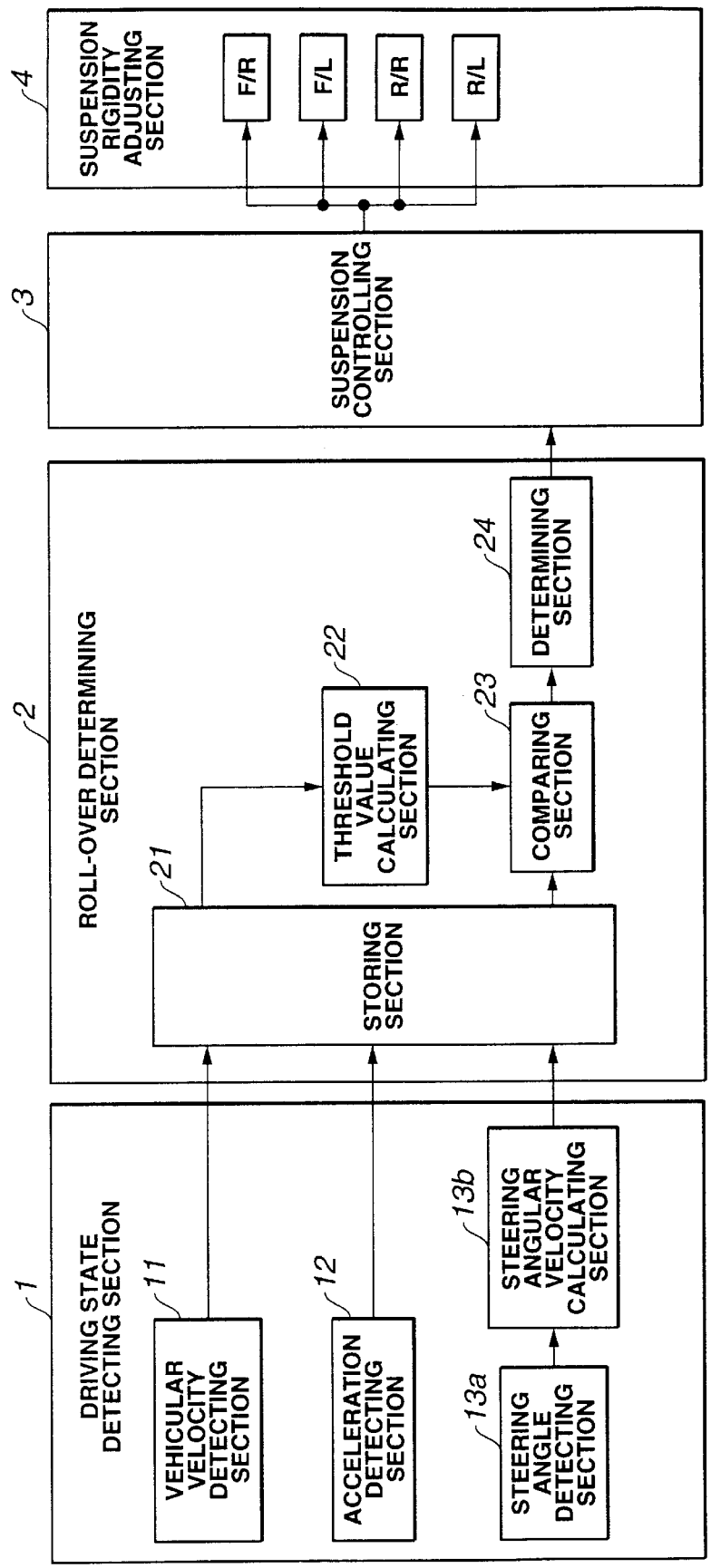
FIG. 1 is a control block diagram of a vehicular suspension rigidity controlling apparatus (with a vehicular roll-over preventive feature) in a first preferred embodiment according to the present invention.

FIG. 1 shows a control block diagram of the vehicular suspension rigidity controlling apparatus in the first embodiment according to the present invention.

Figure 2:
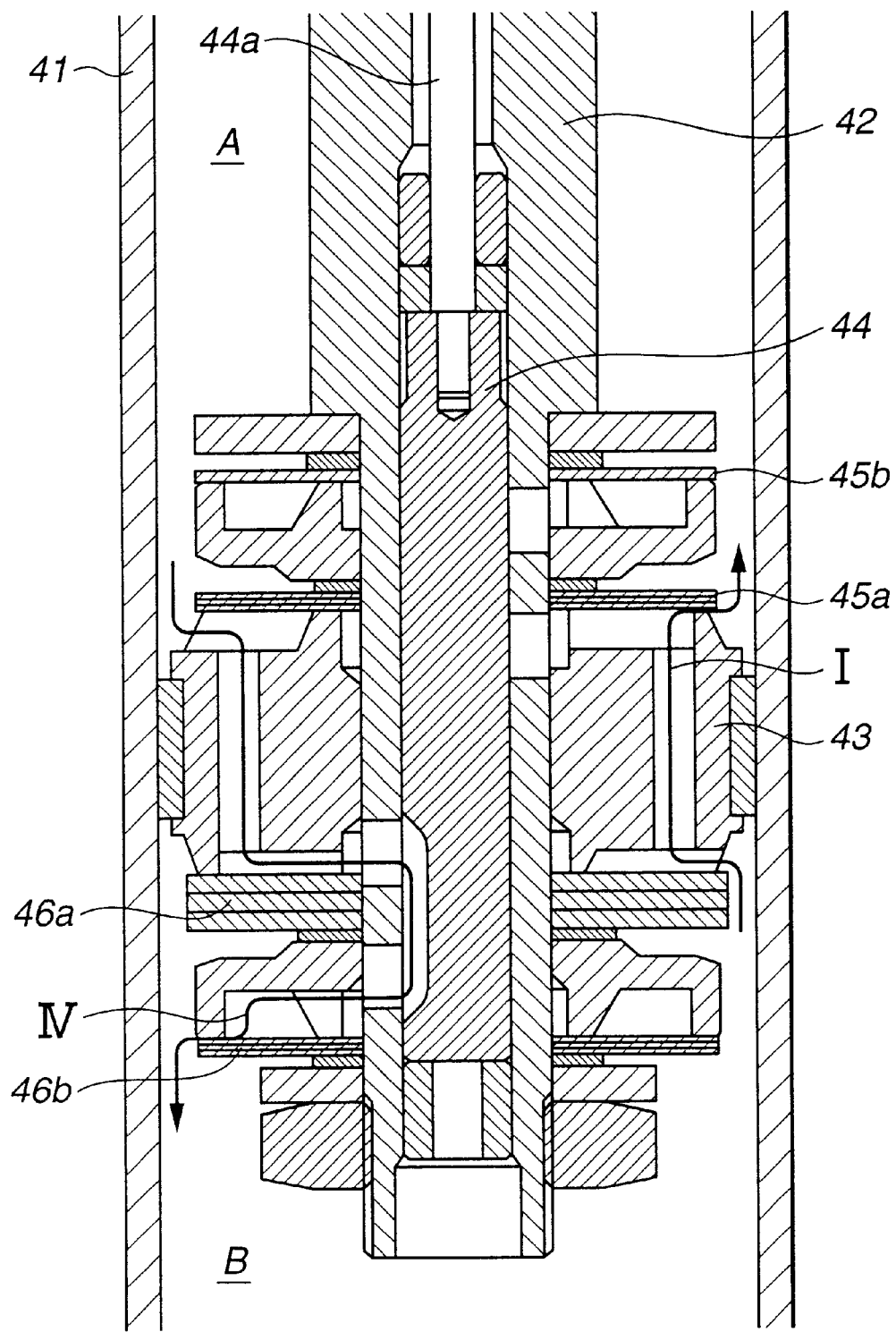
FIG. 2 is a longitudinally cross sectional view representing a normal position of a shock absorber in the vehicular suspension rigidity controlling apparatus in the first embodiment shown in FIG. 1.
Figure 3:
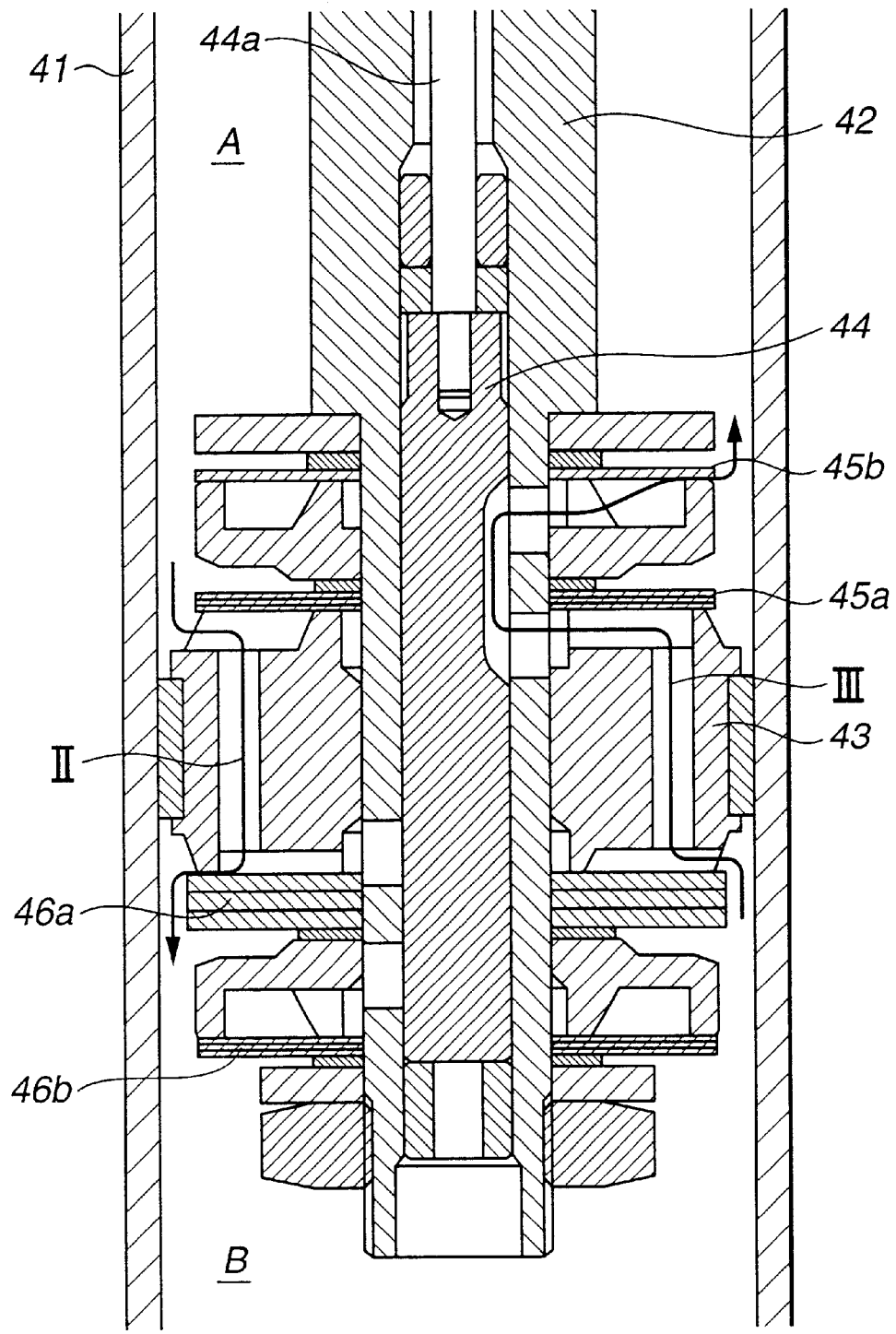
FIG. 3 is a longitudinally cross sectional view representing a vehicular roll-over prevention position of the shock absorber in the vehicular suspension rigidity controlling apparatus in the first embodiment shown in FIG. 1.
Figure 4:
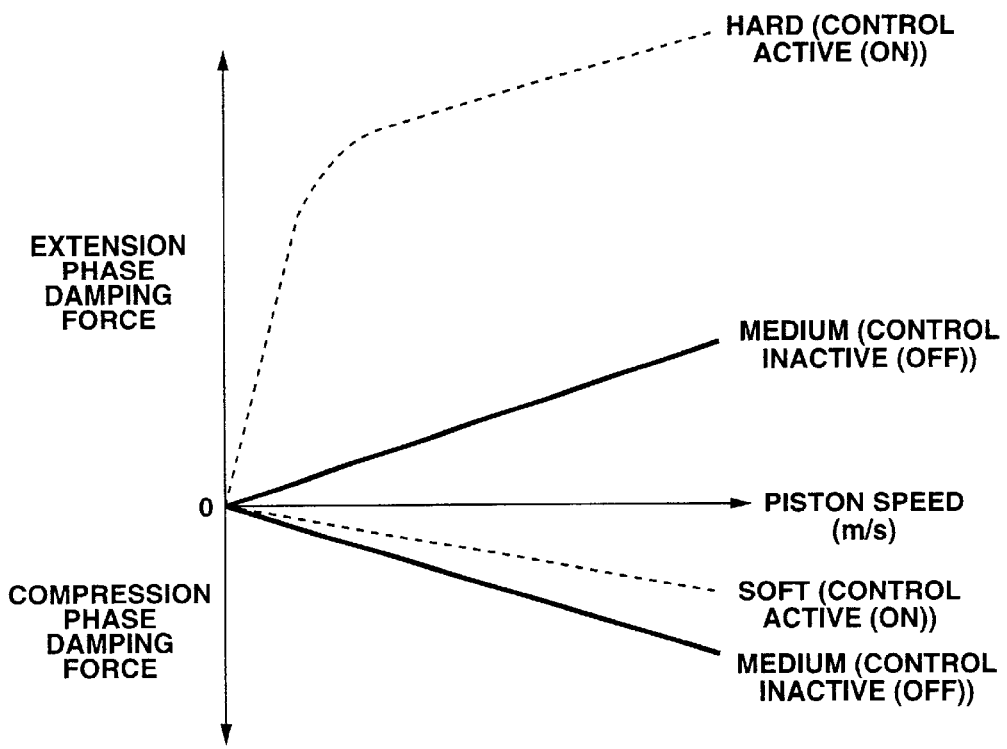
FIG. 4 is a damping force characteristic graph of the shock absorber with respect to a piston speed in the vehicular suspension rigidity controlling apparatus in the first embodiment shown in FIG. 1.
Figure 5:
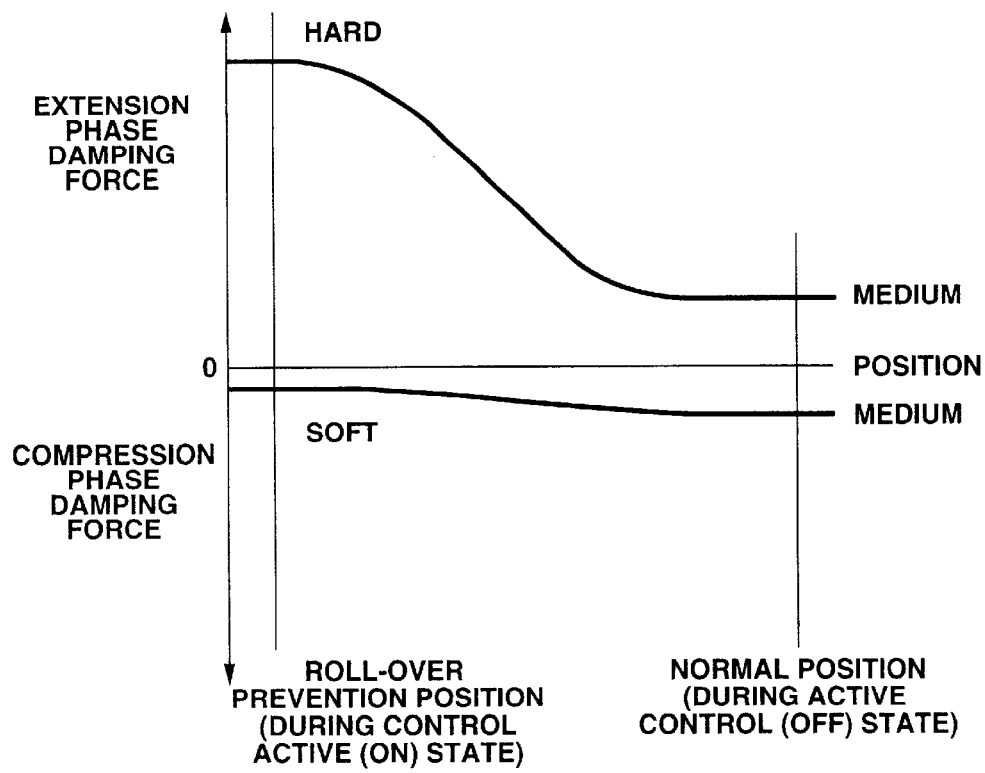
FIG. 5 is a damping force variable characteristic graph of the shock absorber in the vehicular suspension rigidity controlling apparatus in the vehicular suspension rigidity controlling apparatus in the first embodiment shown in FIG. 1.
Figure 6:
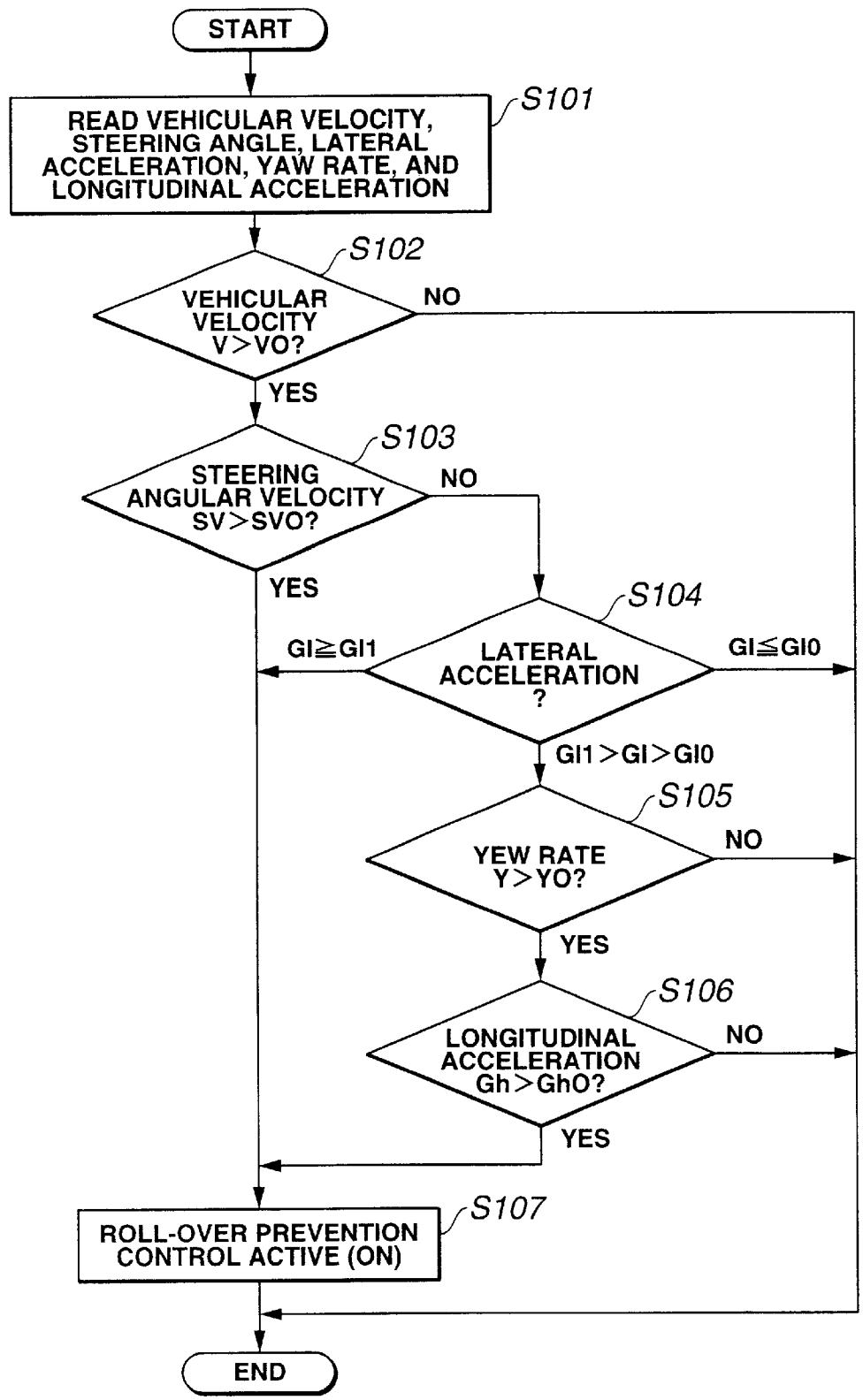
FIG. 6 is an operational flowchart representing a vehicular roll-over prevention determination control routine executed in the vehicular suspension rigidity controlling apparatus in the first embodiment shown in FIG. 1.
Figure 7:
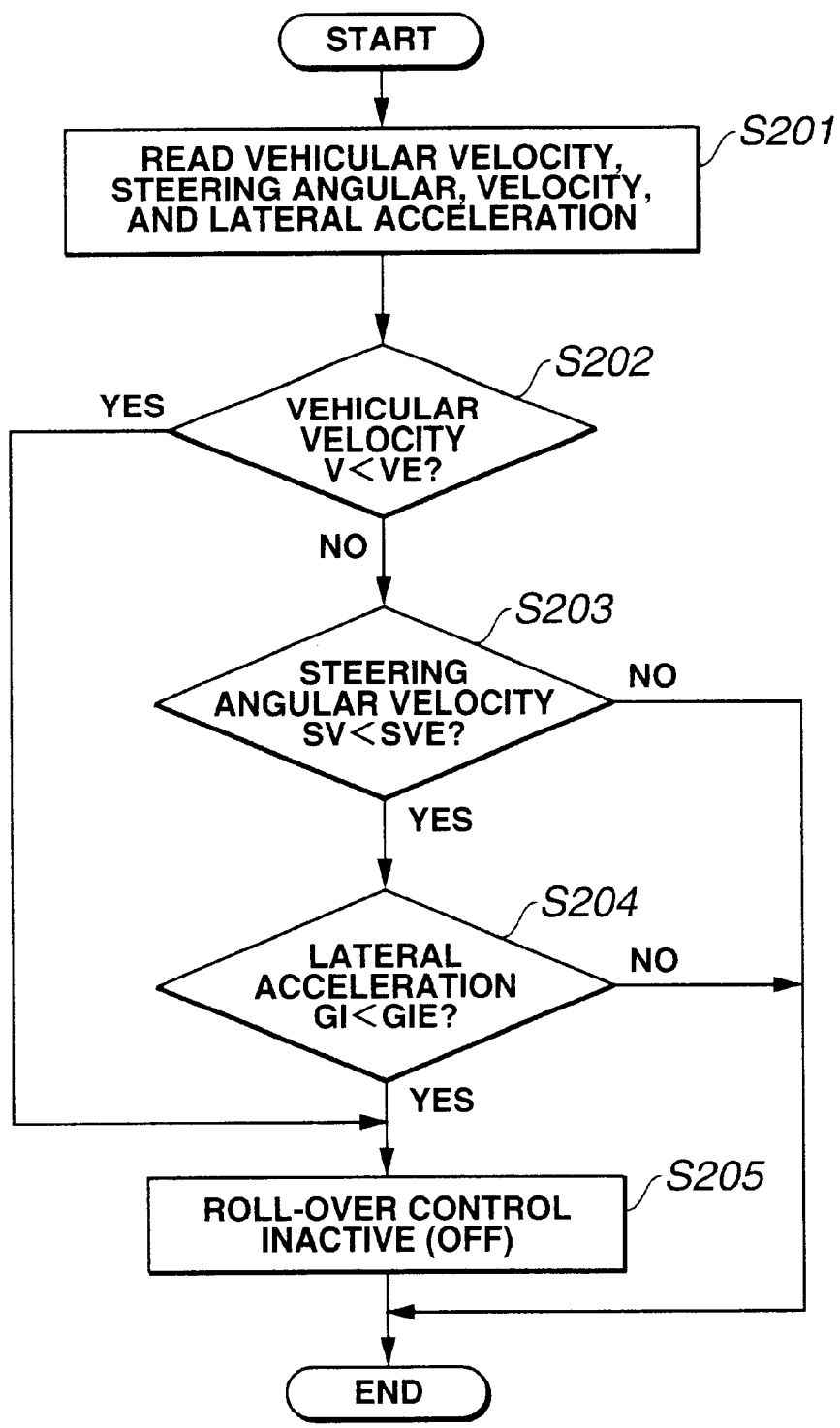
FIG. 7 is an operational flowchart representing a vehicular roll-over prevention determination release control routine executed in the vehicular suspension rigidity controlling apparatus in the first embodiment shown in FIG. 1.

FIGS. 2 and 3 show longitudinal cross sectional views of a shock absorber as a suspension to suspend the vehicle. It is noted that, in the whole specification, the term of the suspension corresponds to the shock absorber. FIG. 4 shows a damping force characteristic graph of the shock absorber with respect to a piston speed thereof. FIG. 5 shows a damping force variable characteristic of the shock absorber. FIG. 6 shows a flowchart representing a vehicular roll-over prevention determination control routine executed in the vehicular suspension rigidity controlling preventing apparatus in the first embodiment shown in FIG. 1. FIG. 7 shows a flowchart representing a vehicular roll-over prevention determination release control routine in the vehicular suspension rigidity controlling apparatus in the second embodiment shown in FIG. 1. The vehicular suspension rigidity controlling apparatus in the first embodiment, as shown in FIG. 1, includes: a driving state detecting section 1; a roll-over determining section 2; a suspension controlling section 3; and a suspension rigidity adjusting section 4.

In more details, driving state detecting section 1 detects determination information on whether there is a possibility that the vehicle is rolled over. Driving state detecting section 1 includes: a vehicular velocity detecting section 11 constituted by a vehicle speed sensor; an acceleration detecting section 13 constituted by a lateral acceleration sensor, a yaw rate sensor, and a longitudinal acceleration sensor; and a steering angular velocity detecting section constituted by a steering angle detecting section 13a constituted by a steering angle sensor that detects a steering angle and a steering angular velocity calculating section 13b that calculates a steering angular velocity from a steering angle indicative signal of the steering angle sensor. Roll-over determining section 2 is constituted by a storing section 21, a threshold value calculating section 22, a comparing section 23, and a determining section 24. Storing section 21 stores: vehicular velocity V detected by a vehicular velocity detecting section 11; a lateral acceleration GI detected by acceleration detecting section 12; a yaw rate Y; a longitudinal acceleration Gh; and a steering angular velocity SV calculated by steering angular velocity calculating section 13b.

Threshold value calculating section 22 calculates the following threshold values; a steering angular velocity threshold value SVO used to determine whether there is a possibility that the vehicle is rolled over in a case where the steering operation is carried out under a vehicular velocity V at a time point at which vehicular velocity V is stored in storing section 21; a lateral acceleration threshold value GI1 used to determine whether there is a possibility that the vehicle is rolled over and another lateral acceleration value GI0 used to determine whether there is no possibility that the vehicle is rolled over, although steering angular velocity SV is determined to be lower than steering angular velocity threshold value SV0; and a yaw rate threshold value Y0 used to further determine whether there is a possibility that the vehicle is rolled over and a longitudinal acceleration threshold value Gh0 used to further determine whether there is a possibility that the vehicle is rolled over, although steering angular velocity SV is lower than steering angular velocity threshold value SV0 and the lateral acceleration does not correspond to the lateral acceleration threshold value GI1 used to determine whether there is a possibility that the vehicle is rolled over and the other lateral acceleration threshold value GI0 used to determine whether there is no possibility that the vehicle is rolled over.

Comparing section 23 compares vehicular velocity V, lateral acceleration GI, yaw rate Y, longitudinal acceleration Gh with preset vehicular velocity threshold value V0 stored in storing section 21, lateral acceleration threshold values GI0 and GI1, yaw rate threshold value Y0, and longitudinal acceleration threshold value Gh0. Then, determining section 24 determines whether a vehicular roll-over prevention control should be started (activated (ON)) on the basis of a result of each comparison as will be described later.

Suspension controlling section 3 performs a control of a damping force characteristic adjusting mechanism of each shock absorber F/R, F/L, R/R, and R/L constituting a suspension rigidity adjusting section 4 on the basis of the result of a determination by determining section 24. Shock absorber F/R is intervened between the vehicle body and a front right road wheel. Shock absorber F/L is intervened between the vehicle body and a front left road wheel. Shock absorber R/R is intervened between the vehicle body and a rear right road wheel. Shock absorber R/L is intervened between the vehicle body and a rear left road wheel.

Next, a damping force characteristic adjusting mechanism constituting suspension rigidity adjusting section 4 of each shock absorber interposed between a sprung mass (vehicle body) and an unsprung mass (the corresponding road wheel) of the vehicle will be described with reference to FIGS. 2 and 3. FIG. 2 shows a normal position state with a medium damping force characteristic in a compression phase and with the medium damping force characteristic phase in an extension phase. FIG. 3 shows a roll-over prevention position with a soft damping force characteristic in the compression phase and with a hard damping force characteristic in the extension phase. In FIGS. 2 and 3, a reference numeral 41 denotes a cylinder tube, a reference numeral 42 denotes a piston rod, a reference numeral 43 denotes a piston, and a reference numeral 44 denotes a control valve. Piston 43 is assembled onto a lower end of piston rod 42 so as to define an upper chamber A and a lower chamber B within cylinder tube 41.

A compression phase medium damping valve 45a, a compression phase low damping valve 45b, an extension phase high damping valve 46a, and an extension phase high damping valve 46a, and an extension phase medium damping valve 46b are assembled onto piston 43. Compression phase medium damping valve 45a serves to develop a medium damping force at a compression stroke of the shock absorber. Compression phase low damping valve 45b serves to develop a low damping force at the compression stroke. Extension phase high damping valve 46a serves to develop the high damping force at the extension stroke. Extension phase medium damping valve 46b serves to develope the medium damping force at the extension stroke. Compression phase medium damping valve 45a is installed in a midway through a compression phase first communication passage I which is always communicated between upper chamber A and lower chamber B. Extension phase high damping valve 46a is installed in a midway through an extension phase first communication passage II which is always communicated between the upper chamber A and the lower chamber B. On the other hand, compression phase low damping valve 45b is installed in a midway through compression phase second communication passage III which is always communicated with upper chamber A and lower chamber B via control valve 44. Extension phase medium damping valve 46b is installed in a midway through extension phase second communication passage IV. Control valve 44 is pivotally disposed within piston rod 42. A stepping motor (not shown) causes control valve 44 to be pivoted via a control rod 44a. Thus, the shock absorber is switched between the normal position state in which compression phase second communication passage III is closed and extension phase second compression passage IV is opened as shown in FIG. 2 and the roll-over prevention position state in which extension phase second communication passage IV is closed and compression phase second communication passage III is opened.

That is to say, at the normal position state shown in FIG. 2, a working fluid within lower changer B during the compression stroke opens medium damping valve 45a installed in a midway through compression phase first communication passage I to flow into upper chamber A. Thus, the medium damping force characteristic (compression side medium) is formed.

In addition, during the extension stroke, the working fluid within upper chamber A opens extension phase medium damping valve 46b intervened in a midway through extension phase second communication passage IV to open extension phase medium damping valve 46b to flow into the lower chamber B. Thus, the medium damping force characteristic (extension phase medium) is exhibited (refer to a damping force characteristic graph with respect to a piston speed of FIG. 4 denoted by a solid line therein).

In addition, at the roll-over prevention position state shown in FIG. 3, the working fluid within lower chamber B causes compression phase low damping valve 45b installed in a midway through compression phase second communication passage III to be opened to flow into upper chamber A during the compression stroke. Thus, the compression stroke provides the low damping force characteristic (compression phase soft). On the other hand, during the extension stroke, the working fluid within upper chamber A opens extension phase high damping valve 46a intervened in the midway through extension phase first communication passage II to be opened to flow into the lower chamber B. Thus, the high damping force characteristic (extension phase hard) is exhibited (refer to the damping force characteristic diagram with respect to the piston speed in FIG. 4 denoted by a dot line.) When control valve 44 is pivoted from the roll-over prevention position state shown in FIG. 4 to the normal position state shown in FIG. 2, the damping force characteristic at the extension phase is gradually varied from the hard position to the medium and, on the other hand, the damping force characteristic at the compression stroke is gradually varied from the soft position to the medium position.

Next, FIG. 6 shows a flowchart representing a roll-over prevention determination control routine. At a step S101, roll-over determining section 2 (comparing section 23 and determining section 24) reads vehicular velocity V, steering angular velocity SV, yaw rate Y, and longitudinal acceleration Gh stored in storing section 21. At a step S102, comparing section 23 and determining section 24 determine whether the read vehicular velocity V is in excess of vehicular velocity threshold value VO. If No (V≧VO) at step S102, roll-over determining section 2 determines that there is no possibility that the vehicle is rolled over and the routine shown in FIG. 6 is once ended. On the other hand, if Yes (V>V0) at step 102, the routine goes to a step S103 since there is a possibility that the vehicle is rolled over depending upon a steered state of the vehicle. At a step S103, comparing section and determining section 23 and 24 determine whether the read steering angular velocity SV (an absolute value of the steering angular velocity) is in excess of steering angular velocity threshold value SV0. If Yes (SV>SV0) at step S103, the read steering angular velocity SV is determined to be in excess of steering angular velocity threshold value SV0 so that there is a possibility that the vehicle is rolled over and the routine goes to a step S107. At step S107, the roll-over prevention control is started (ON). The details of the roll-over prevention control will be described later.

If the determination at a step S103 is No (SV≦SV0), determining section 24 determines that there is no possibility that the vehicle is rolled over although the determination of the possibility according to vehicular velocity V and steering angular velocity SV has been made. However, depending upon the other situation such as the gradient state of the road surface and the steering angle, there is still a possibility that the vehicle is rolled over. Hence, to make the determination of the possibility more accurate, the routine goes to a step S104.

At step S104, comparing section 23 and determining section 24 compare read lateral acceleration GI with two lateral acceleration threshold values GI0 and GI1. Lateral acceleration threshold value GI0 is a value of lateral acceleration GI such that there is no or least possibility that the vehicle is rolled over (a probability of the vehicular roll-over is near to zero). Lateral acceleration threshold value GI1 is a value of lateral acceleration GI such that there is a possibility that the vehicle is rolled over. Hence, if lateral acceleration G1 is equal to or larger than this lateral acceleration threshold value GI1 (GI≧GI1) at step S104, the routine goes to step S107. If GI0<GI<GI1 at step S104, the routine goes to a step S105. At step S105, comparing section 23 and determining section 24 of roll-over determining section 2 determine whether read yaw rate Y is larger than yaw rate threshold value Y0. If No (Y≦Y0) at step S105, the routine is ended since there is no possibility that the vehicle is rolled over. If Yes (Y>Y0) at step S105, the routine goes to a step S106. At step S106, roll-over determining section 2, viz., comparing section 23 and determining section 24 determine whether read longitudinal acceleration Gh is in excess of longitudinal acceleration threshold value GhO. If No (Gh≦GhO) at step S106, the routine of FIG. 6 is ended since there is no possibility that the vehicle is rolled over. If Yes (Gh>GhO) at step S106, there is a possibility that the vehicle is rolled over due to a vehicular run on a descending slope or due to an abrupt (hard) braking and the routine goes to step S107. At step S107, the roll-over prevention control is started (active) (ON). If the roll-over prevention control is started (active ON), suspension controlling section 3 controls the position state of the shock absorber via the damping force adjusting mechanism from the normal position state as shown in FIG. 2 to the roll-over prevention position shown in FIG. 3. That is to say, when the roll-over prevention control is started, the damping force characteristic at the extension stroke is hard (the suspension rigidity (at the extension stroke) is large) and that at the compression stroke is soft (the suspension rigidity (at the compression stroke) is small).

Figure 8:
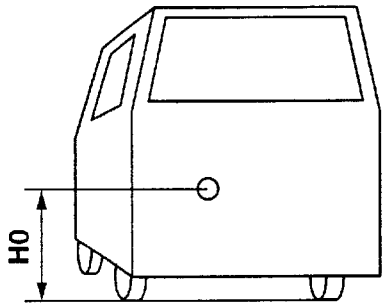
FIGS. 8AA, 8AB, 8BA, 8BB, 8CA, and 8CB are explanatory views representing simulation results in the case of the vehicular suspension rigidity controlling apparatus in the first embodiment shown in FIG. 1.

As described above, when the steering operation through the steering wheel of the vehicle is carried out from a straight running state of the vehicle and the roll-over prevention control is started (active ON), suspension controlling section 3 and suspension rigidity adjusting section 4 controllably switches the position state of at least one shock absorber (or each shock absorber F/R, F/L, R/R, and R/L) from the normal position state shown in FIG. 2 to the roll-over prevention position state shown in FIG. 3. That is to say, when the roll-over prevention control is started (active ON) at step S107, the damping force characteristic at the extension phase becomes hard (the suspension rigidity is large) and the damping force characteristic at the compression phase becomes soft (the suspension rigidity is small). As described above, if the steering operation is carried out from the straight running state and the roll-over prevention control is started (active (ON)), the position state is switched to the roll-over prevention position (extension phase hard, compression phase soft) so that a float of an inner wheel side vehicle body due to a roll behavior based on the steering operation, as shown in a simulation result of FIG. 8BB (during the roll-over prevention control is (active) ON) and during the steering operation) from among simulation results of FIGS. 8AA through 8CB, is suppressed by the extension phase damping force hard characteristic (the suspension rigidity is large) of the shock absorbers related to the inner wheels and a dive of an outer wheel side vehicle body due to the roll behavior is accelerated according to the soft compression phase damping force characteristic of the shock absorbers (the suspension rigidity is small) located at the outer wheels. As a result of this, a height of a vehicular weight center H1ON (refer to FIG. 8BB) becomes lower than vehicular weight center height H1OFF (refer to FIG. 8BA) at a time at which the roll-over prevention control is turned to OFF (inactive) during the steering operation. Thus, a potential energy of the sprung mass of the vehicle is acted upon in the decrease direction. Hence, the roll moment applied to the vehicle body during the steering operation is decreased. Thus, such a vehicular roll-over prevention effect as described above can be increased when the steering operation is carried out.

Next, as a result of a further steering operation in a reverse direction to the normal steering operation (when a turning state is transferred from a first turning state to a second turning state which is reverse to the first turning state) from a state in which the roll-over prevention control (active (ON)) is being carried out during the steering operation (FIG. 8BA control ON), the roll-over prevention control is newly started. At this time, as shown in FIG. 8CB (during the reverse steering with the roll-over prevention control active (OFF)), the float of the inner wheel side vehicle body due to the roll behavior based on the reverse steering operation is suppressed by the hard extension phase damping force characteristic of the shock absorbers located at the inner wheel side (the suspension rigidity is large) and the dive of the outer wheel side vehicle body is accelerated by the compression phase soft damping force characteristic (the suspension rigidity thereat is small). At this time, the vehicular weight center height H2ON (FIG. 8BB) becomes furthermore lower than vehicular weight center height H1ON when the roll-over prevention control is active (ON) during the steering operation (FIG. 8BB). Hence, the potential energy of the sprung mass of the vehicle is acted upon in the decrease direction. Thus, the roll moment applied to the vehicle body during the reverse direction to the originally steered direction is decreased. Thus, such a vehicular roll-over prevention effect during a time at which the reverse steering operation to the originally steered direction is carried out. It is noted that FIGS. 8AA and 8AB show the roll-over prevention control off (inactive state) and on (active) when the vehicle is stopped, FIGS. 8BA and 8BB show the roll-over prevention control off (inactive) and on (active) when the vehicle is steered in a steering direction, and FIGS. 8CA and 8CB show the roll-over prevention control off (inactive) and on (active) when the vehicular turning state is transferred from a first turning state to a second turning state which is reverse to the first turning state (reverse steering operation to the originally steered direxion).

It is noted that, even in a case where the reverse steering operation is carried out after the steering operation to a degree at which the roll-over prevention control is not started is carried out, the roll-over prevention control can be started. In this case, it is of course that the vehicular roll-over prevention effect can be enhanced. In addition, under a state wherein the roll-over prevention control is started (active (ON)), the vehicle is bounced due to a bound input from a road surface. At this time, the damping force characteristic of hard extension phase and soft compression phase causes the shock absorber to be moved in a shrinkage direction. Hence, as the vehicle body is behaved (moved), the vehicular body weight center height is acted in its lower direction.

In addition, as the result of simulation, the roll-over prevention effect could be exhibited when the piston speed (a maximum control force response relative velocity) was 0.05 m/s or less and a force equal to or above 70% of a sprung weight that the shock absorber charges was developed, as the extension phase damping force characteristic and, when the force equal to or higher than 70% of the sprung weight at the piston speed of 0.03 m/s or less was developed, a large roll-over prevention effect could be exhibited suppressing a rise in the vehicular weight center's height.

Next, FIG. 7 shows an operational flowchart of a release determination control routine of the roll-over prevention determination control. At a step S201, roll-over determining section 2 (comparing section 23 and determining section 24) reads vehicular velocity V, steering angular velocity SV, and lateral acceleration GI. At a step S202, comparing section 23 and determining section 24 determine whether read vehicular velocity V is reduced and lower than a release vehicular velocity threshold value VE. If Yes (V<VE) at step S202, the roll-over determining section 2 determines that there is no possibility that the vehicle is rolled over and the routine goes to a step S205 at which the roll over prevention control is released (made in active (OFF)). If No (V≧VE) at step S202, the routine goes to step S203 since there is still a possibility that the vehicle is rolled over depending upon the value(s) of steering angular velocity (SV) and lateral acceleration GI.

At step S203, comparing section 23 and determining section 24 determine whether read steering angular velocity SV is reduced and lower than a release steering angular velocity threshold value SVE. If No (SV ≧SVE) at step S203, there is still a possibility that the vehicle is rolled over and the present routine of FIG. 7 is ended. If Yes (SV<SVE) at step S203, the routine goes to step S204 to furthermore make a determination by further lateral acceleration GI. Then, the routine goes to a step S204.

At step S204, comparing section 23 and determining section 24 determine whether the read lateral acceleration GI is lower than a release lateral acceleration threshold value GIE. If No (GI≧GIE) at step S204, the routine is once ended since there is still the possibility that the vehicle is rolled over. If Yes (GI<GIE) at step S204, the routine goes to a step S205 since there is no possibility that the vehicle is rolled over and the roll-over prevention control is released (inactive (OFF)).

Next, the vehicular suspension rigidity controlling apparatus in other preferred embodiments will be described. For the explanation of the other embodiments, the same reference numerals as those described in the first embodiment designate like elements. Hence, a detailed explanation of each of the elements having the same reference numerals will be omitted herein but only the difference point from the first embodiment will be described below.

Second Embodiment

Figure 9:
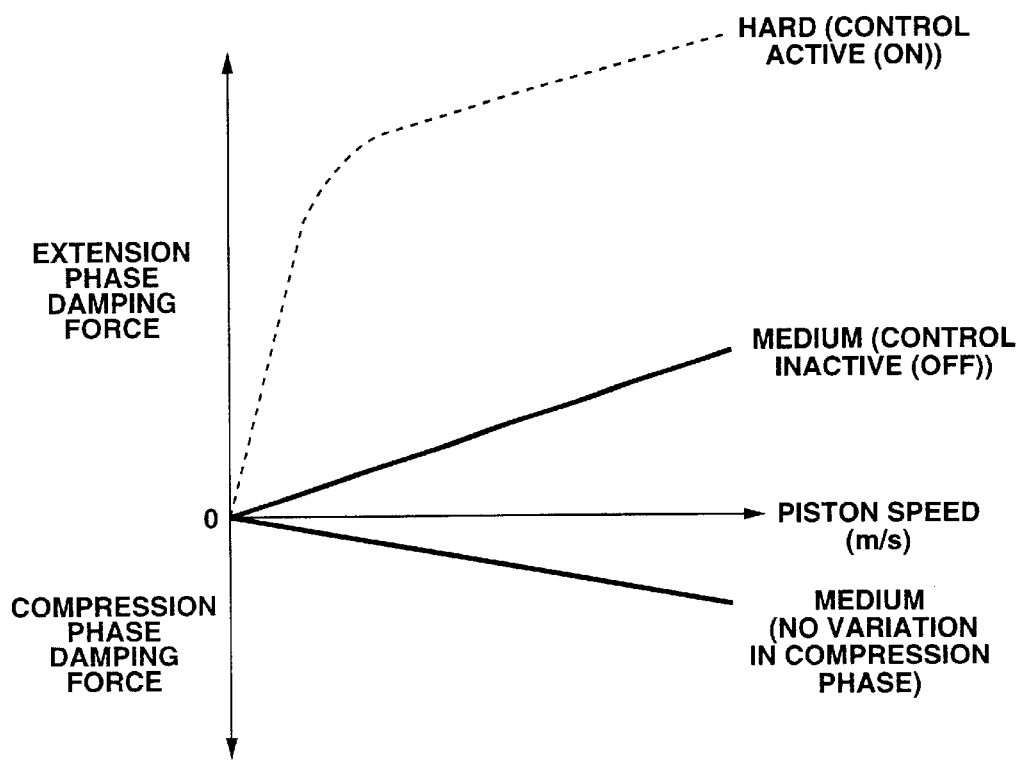
FIG. 9 is a damping force characteristic graph representing with respect to the piston speed of the shock absorber in the vehicular suspension rigidity controlling apparatus in a second preferred embodiment according to the present invention.
Figure 10:
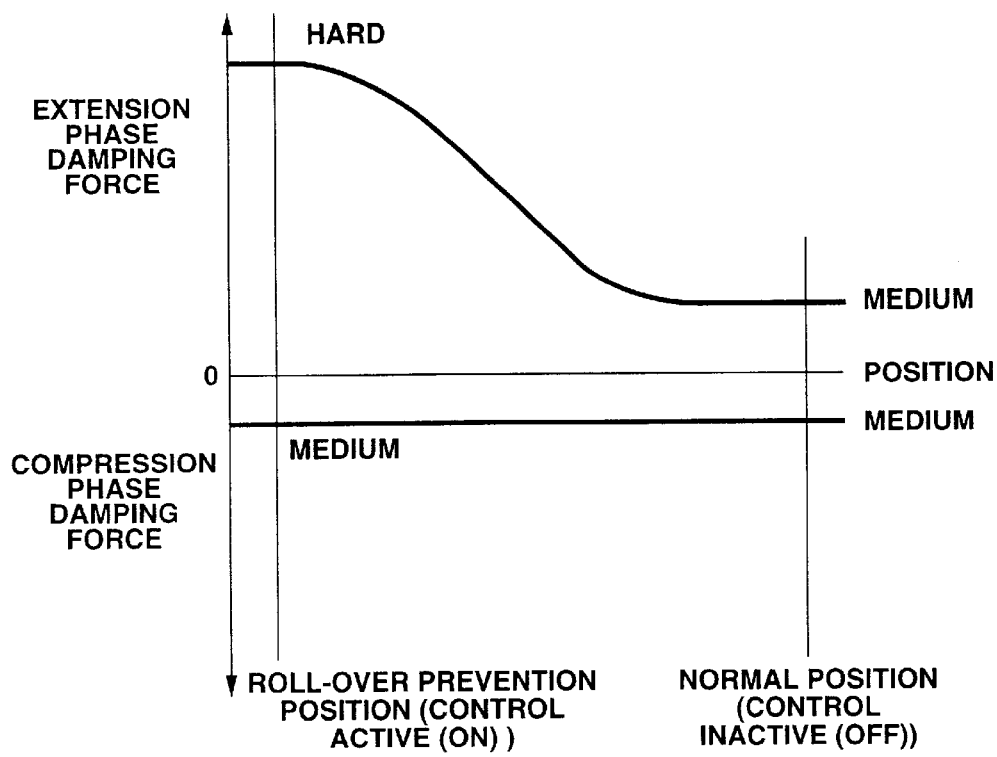
FIG. 10 is a damping force variable characteristic graph of the shock absorber in the vehicular suspension rigidity controlling apparatus in the second embodiment.

In the vehicular suspension rigidity controlling apparatus in a second preferred embodiment according to the present invention, the difference point in the second embodiment from the first embodiment is as follows: As shown by the damping force variable characteristic diagram of FIG. 10 and by the damping force characteristic diagram with respect to the piston speed of FIG. 9, another type of shock absorber (suspension rigidity adjusting section 4) having the damping force characteristic at the compression stroke side is fixed at the medium characteristic and only the damping force characteristic and only the damping force characteristic at the extension stroke side is switched at an unlimited stage between the hard characteristic and the soft characteristic.

Hence, the float of the inner wheel side vehicle body during the steering operation state and during the reverse steering operation to the originally steered direction is suppressed by the extension phase damping force hard characteristic (the rigidity thereat becomes large) of the shock absorbers located at the inner wheel side. Consequently, the extension phase damping force hard characteristic acts the vehicular weight center height to be decreased in the lower direction. This causes the potential energy of the sprung mass of the vehicle to be decreased. Hence, the roll moment applied to the vehicle body is decreased. This permits the roll-over preventing effect of the vehicle to be enhanced during the steering operation and during the reverse steering operation to the originally steered direction.

Third Embodiment

The vehicular suspension rigidity controlling apparatus in a third preferred embodiment according to the present invention will be described below. In the vehicular suspension rigidity controlling apparatus in the third embodiment, each shock absorber constituting suspension rigidity adjusting section 4 is provided with a one-way rigidity switching mechanism in which only suspension rigidity at the extension stroke is switchable according to a frictional force of a frictional member. This is the difference point from each of the first and second embodiments. The structure of the one-way rigidity switching mechanism described with reference to FIGS. 11 and 12.

Figure 11:
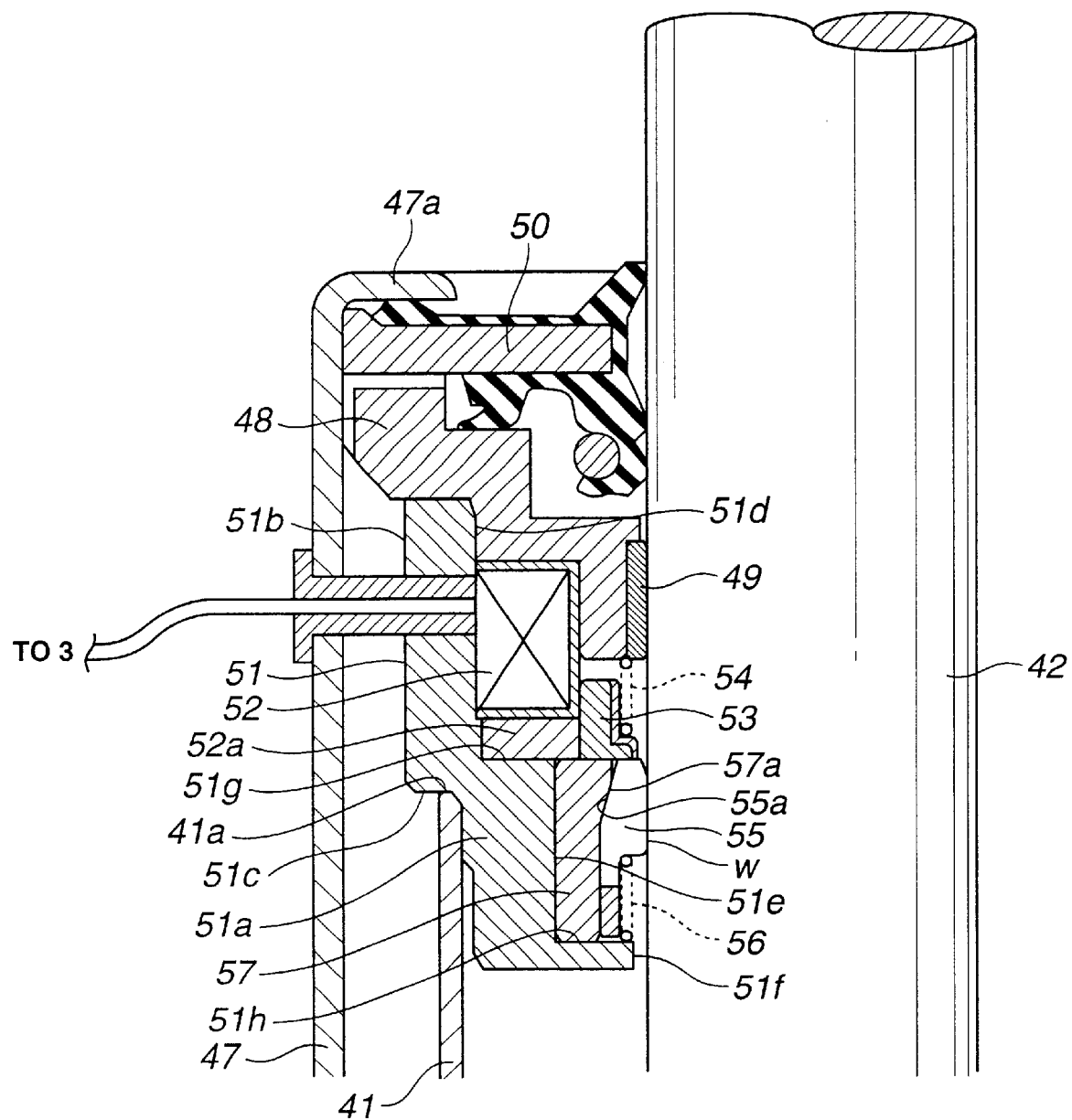
FIG. 11 is a longitudinally cross sectional view of an essential part of the shock absorber representing a state in which the vehicular roll-over prevention control is halted in the vehicular suspension rigidity controlling apparatus in a third preferred embodiment according to the present invention.
Figure 12:
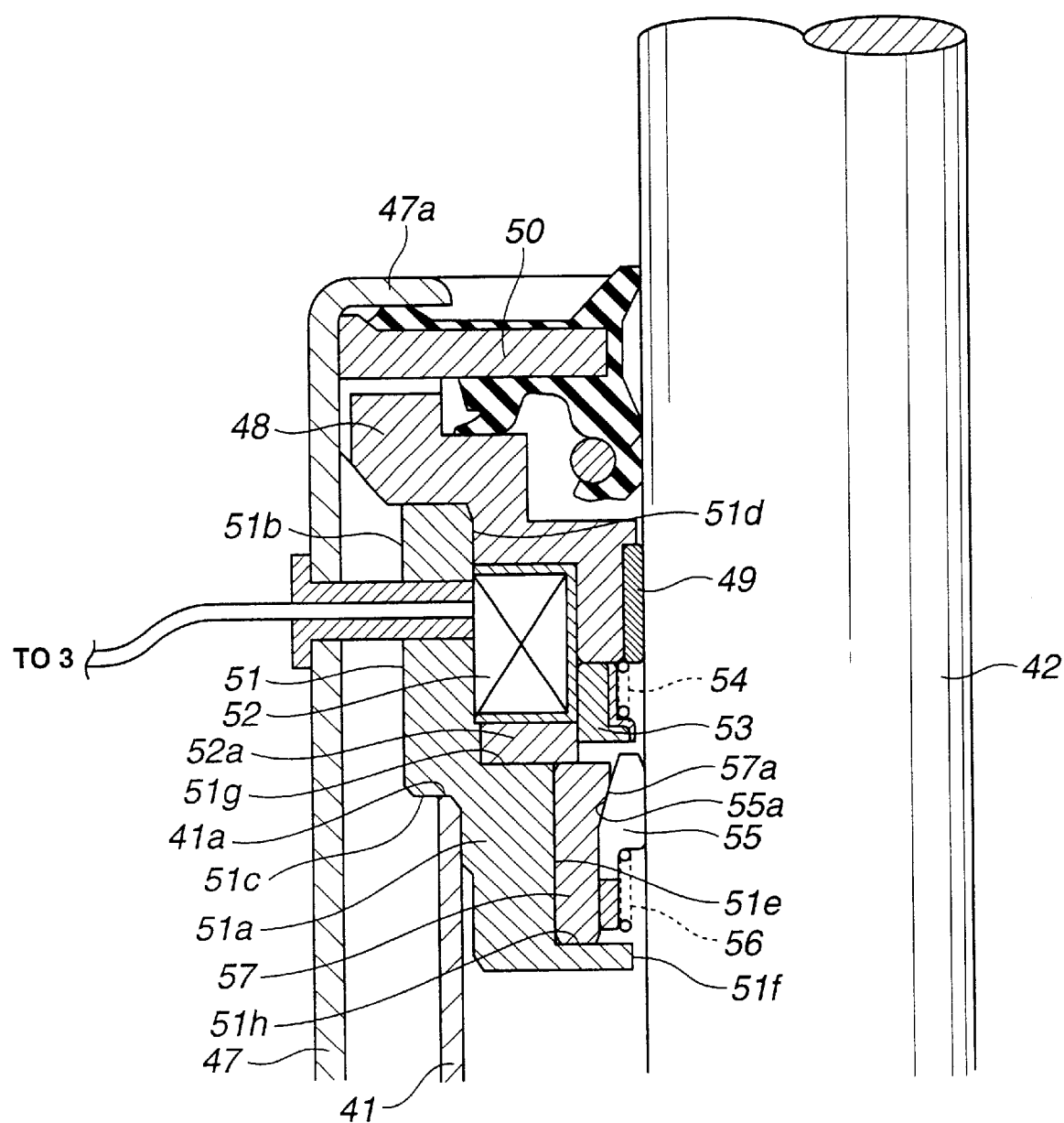
FIG. 12 is a longitudinally cross sectional view of the essential part of the shock absorber representing a state in which the vehicular roll-over prevention control is started in the vehicular suspension rigidity controlling apparatus in the third embodiment according to the present invention.

FIG. 11 shows a longitudinal cross sectional view representing an essential part of the shock absorber in the third embodiment indicating a state in which the vehicular roll-over prevention control is halted (inactive (OFF)). FIG. 12 shows the longitudinal cross sectional view representing the essential part of the shock absorber indicating a state in which the vehicular roll-over prevention control start (active (ON)) occurs. In FIGS. 11 and 12, reference numeral 41 denotes cylindrical tube (also called, an inner tube, reference numeral 42 denotes piston rod, a reference numeral 47 denotes an outer tube, a reference numeral 48 denotes an outer tube, a reference numeral 48 denotes a rod guide, a reference numeral 49 denotes a guide bush, a reference numeral 50 denotes an oil seal, a reference numeral 51 denotes a one-way rigidity switching mechanism assemble member (hereinafter, abbreviated as a mechanism assembling member), a reference numeral 52 denotes a solenoid, a reference numeral 53 denotes a spool, a reference numeral 54 denotes a return spring, a reference numeral 55 denotes a frictional member, a reference numeral 56 denotes a pressure spring, a reference numeral 57 denotes an operation guide member. In more details, mechanism assembling member 51 is annularly formed and has different diameters. A lower end small-diameter portion 51a thereof is inserted into an upper end opening portion of cylindrical tube (inner tube) 41. An annular step portion 51c formed at an boundary portion to an upper end large diameter portion 51c engaged on an opening end 41a of cylindrical tube (inner tube) 41. A hollow portion of mechanism assembled member 51 has different diameters and includes a large-diameter hole portion 51d, an intermediate-diameter hole portion 51e, and a small-diameter hole portion 51f in an upper portion order. Annular step portions 51g and 51h are formed on each boundary portion. Rod guide 48 is inserted within outer tube 47 with its outer peripheral portion engaged on an upper end opening portion of mechanism assembled member 51. Oil seal 50 is engaged on an upper portion of outer tube 47. In this state, an upper end caulking portion 47a of outer tube 47 is bent and caulked onto an upper part of oil seal 50. Oil seal 50, rod guide 48, and an outer peripheral portion of mechanism assembling member 51 are assembled into and fixed with these members 50, 48, and 51 grasped in an axial direction. Solenoid 52 is assembled within large-diameter hole portion 51d of mechanism assembling member 51 with a spacer 52a interposed between a lower end portion of solenoid 52 and annular step portion 51g and is fixed between rod guide 48 and annular step portion 51g and is fixed between rod guide 48 and annular step portion 51g in an axial grasped state. Spool 53 is assembled so as to position along the lower end portion of solenoid 52 which is an inner part of solenoid 52 and spacer 52a and so as to enable an axial movement (in an upward and lower direction as viewed from FIGS. 11 and 12).

On the other hand, an operation guide member 57 to guide the operation of frictional member 55 is attached within an intermediate diameter hole portion 51e. Operation guide member 57 is fixed under a state grasped between annular step portion 51h and spacer 52a.

In addition, an annularly tapered surface 57a which is tilted in a direction for its hole diameter to be decreased as an inner surface of operation guide member 57 is directed from an intermediate portion to an upper end portion thereof is formed. In addition, spool 53 is axially movable in a limited range between the upper end surface of operation guide member 57 and rod guide 48. Return spring 54 causes spool 53 to be contacted with operation guide member 57. That is to say, spool 53 is pressed and biased in a direction away from solenoid 52 in the downward direction.

Frictional member 55 is constituted annularly by a material having a high frictional coefficient and a flexibility and is biased movably in its axial direction within operation guide member 57. Frictional member 55 is divided into a plurality of sections in its peripheral direction with the lower end portion left unchanged. An outer peripheral surface of frictional member 55 is formed as a tapered annular surface 55a from an intermediate portion of frictional member 55 along an annular tapered surface 57a of operation guide member 57. Frictional member 55 is biased to be pressed in the upward direction by means of pressure return spring 56. The pressure biasing force causes frictional member 55 to be moved in the upward direction. The frictional member 55 is, then, guided along annular tapered surface 57a of operation guide member 57 so that a diameter of an upper part of frictional member 55 becomes shortened. Then, an inner peripheral surface of frictional member 55 is guided in a direction so as to be contacted with an outer peripheral surface of piston rod 42 (refer to FIG. 12).

However, the upper end surface of frictional member 55 is contacted with the inner lower end surface of spool 53. A biasing force of pressure spring 56 to bias frictional member 55 in the upward direction is set to be weaker than the biasing force of return spring 54 to press spool 53 in the downward direction. This causes, as shown in FIG. 11, the pressure biasing force of return spring 54 to press spool 53 in the downward direction. Hence, spool 53 contacted with operation guide member 57 causes the rise in frictional member 55 to be blocked. Thus, in this state, a predetermined clearance w between the inner peripheral surface of frictional member 55 and outer peripheral surface of piston rod 42 is formed.

Since, in the third embodiment, one-way rigidity switching mechanism of shock absorber is structured as described above, during the stop (OFF) of the roll-over prevention control, the power supply to solenoid 52 is released (turned off) and predetermined clearance w is formed. This predetermined clearance w causes a frictional force F of frictional member 55 against piston rod 42 to be zeroed (suspension rigidity is small). Hence, in this case, only the damping force that the shock absorber naturally has is acted upon.

Next, when the roll-over prevention control is started (active (ON)), the power supply of solenoid 52 is started. As shown in FIG. 12, an attraction force of solenoid 52 causes spool 53 to be lifted in the upward direction against the biasing force of return spring 54. Hence, frictional member 55 whose movement is restricted by means of spool 53 causes the pressing force of pressure spring 56 to be pressed in the upward direction. Then, frictional member 55 is guided along annular tapered surface 57a of operation guide member 57 so that the diameter of an upward portion of frictional member 55 becomes invaded into the lower end of spool 53 lifted in the upward direction, as shown in FIG. 12. Thus, the inner peripheral surface of frictional member 55 is contacted with the outer peripheral surface of piston rod 42.

Since the frictional force is acted in a direction in which frictional member 55 is invaded into a space between piston rod 42 and operation guide member 57 during the extension stroke of shock absorber, a wedge effect causes a large frictional force ($F_T$=large) (the suspension rigidity is large) to be developed. On the other hand, in the compression stroke of shock absorber, a frictional force is acted upon in a direction to release an invasion of frictional member 55 into the above-described space. Hence, the wedge effect is eliminated so that the frictional force $F_T$ between frictional member 55 and piston rod 42 is hardly acted upon ($F_T \approx 0$) (the suspension rigidity is small).

Hence, in the third embodiment of the vehicular suspension rigidity controlling apparatus, the float of the inner wheel side vehicular body during the steering operation and during the reverse steering operation to the originally steered direction is suppressed according to the large rigidity at the extension phase of the inner wheel side shock absorber so that the weight center height of the vehicle is moved in the decrease direction. Hence, the potential energy of the sprung mass of the vehicle is reduced. Thus, the roll moment applied to the vehicle body is decreased. Consequently, the vehicular roll-over prevention effect can be enhanced during the steering operation and during the reverse steering operation described above. The vehicular suspension rigidity controlling apparatus in each of the first, second, and third embodiments has been described with reference to FIGS. 1 through 12. However, the specific structure of the vehicular suspension rigidity controlling apparatus is not limited to these embodiments. For example, in the first embodiment, at the same time when the suspension rigidity at the extension stroke is made large, the suspension rigidity at the compression stroke is made small during the execution of the roll-over prevention control (ON). In addition, in each of the second and third embodiments, only the suspension rigidity at the extension phase side is made large. However, as described in the first embodiment, only according to the suspension rigidity at the compression phase which is made small, the dive of the outer wheel side vehicular body due to the roll behavior (motion) based on the steering operation and based on the reverse steering operation to the originally steered direction is accelerated due to the small suspension phase rigidity of the shock absorbers located at outer wheel side. As a result of this, the vehicular weight center height is acted upon in the lower direction. Consequently, the potential energy of the sprung mass of the vehicle is decreased. Hence, the roll moment applied to the vehicle body is decreased. Consequently, the effect of preventing the vehicular roll-over during the steering operation and during the reverse steering operation to the originally steered direction can be enhanced.

In addition, in each of the first, second, and third embodiments, a circulation of a working fluid is limited or the frictional force is developed so that the rigidity of each (or at least one) shock absorber at the extension phase is made large. Thus, the float of the inner wheel side vehicle body due to the roll motion (behavior) based on the steering and the reverse steering operation to the originally steered direction is suppressed. However, as an alternative, a lock mechanism may be provided to make a complete stop of the stroke of each (or at least one) shock absorber toward the extension phase. Hence, the float of the inner wheel side vehicle body is completely stopped. Thus, the effect of reducing the weight center height can furthermore be enhanced.

In addition, in each of the first and second embodiments, each shock absorber which is capable of adjusting the damping force characteristics at the extension phase and at the compression phase independently of each other has been used. However, each shock absorber which is capable of adjusting the damping force characteristic at both of the extension and compression phases in mutually the same direction may be used. The damping force characteristic control for the vehicular shock absorber is exemplified by a U.S. Pat. No. 6,092,011 issued on Jul. 18, 2000 which is herein incorporated by reference.

The entire contents of a Japanese Patent Application No. 2002-128586 (filed in Japan on Apr. 30, 2002) are herein incorporated by reference. Various changes and modification may be made without departing from the sprit and the scope of the present invention which is defined with reference to the following claims.

What is claimed is:

1. A vehicular suspension rigidity controlling apparatus, comprising:
   a plurality of suspensions, each suspension being intervened between a sprung mass of a vehicle body and an unsprung mass of a corresponding road wheel;
   a suspension rigidity adjusting section that is enabled to adjust a rigidity of each suspension;
   a driving state detecting section that detects a driving state of the vehicle;
   a vehicular roll-over determining section that predictively determines whether the vehicular driving state is a state in which there is a possibility that the vehicle is rolled over from the detected driving state of the vehicle; and
   a suspension controlling section that controllably adjusts the rigidity of at least one of the suspensions via the suspension rigidity adjusting section in a direction to decrease a potential energy of the sprung mass of the vehicle when the vehicular roll-over determining section predictively determines that the vehicular driving state is the state that there is the possibility that the vehicle is rolled over.

2. A vehicular suspension rigidity controlling apparatus as claimed in claim 1, wherein the driving state detecting section comprises at least a vehicular velocity detecting section that detects a vehicular velocity and a steering angular velocity detecting section that detects a steering angular velocity of the vehicle and wherein the vehicular roll-over determining section compares each of the detected vehicular velocity and the detected steering angular velocity with a corresponding one of first predetermined threshold values to predictively determine whether the vehicular driving state is in the state in which there is a possibility that the vehicle is rolled over.

3. A vehicular suspension rigidity controlling apparatus as claimed in claim 1, wherein, when the vehicular roll-over determining section predictively determines that there is a possibility that the vehicle is rolled over, the suspension controlling section adjustably controls the rigidity of the suspension via the suspension rigidity adjusting section in a such a manner that one of an increase direction of the rigidity of the suspension at an extension phase thereof and a decrease direction of the rigidity of the suspension at a compression phase thereof is carried out to decrease the potential energy of the sprung mass of the vehicle.

4. A vehicular suspension rigidity controlling apparatus as claimed in claim 2, wherein the driving state detecting section further comprises a lateral acceleration detecting section that detects a lateral acceleration of the vehicle and the vehicular roll-over determining section compares the detected lateral acceleration with a second predetermined threshold value to determine whether the driving state is a state in which there is still a possibility that the vehicle is rolled over when the vehicular roll-over determining section determines that the driving state is the state in which there is no possibility that the vehicle is rolled over as a result of determination that the driving state is the state in which there is no possibility that the vehicle is rolled over by comparing the detected vehicular velocity and the detected steering angular velocity with the corresponding one of the predetermined threshold values.

5. A vehicular suspension rigidity controlling apparatus as claimed in claim 4, wherein the driving state detecting section further comprises a yaw rate detecting section that detects a yaw rate of the vehicle and the vehicular roll-over determining section compares the detected yaw rate with a third predetermined threshold value to determine whether the driving state is a state in which there is still a possibility that the vehicle is rolled over when the vehicular roll-over determining section determines that the driving state is the state in which there is no possibility that the vehicle is rolled over as a result of determination that the driving state is the state in which there is no possibility that the vehicle is rolled over by comparing the detected lateral acceleration with the second predetermined threshold value.

6. A vehicular suspension rigidity controlling apparatus as claimed in claim 5, wherein the driving state detecting section further comprises a longitudinal acceleration detecting section that detects a longitudinal acceleration of the vehicle and the vehicular roll-over determining section compares the detected longitudinal acceleration with a fourth predetermined threshold value to determine whether the driving state is a state in which there is a possibility that the vehicle is rolled over when the vehicular roll-over determining section determines that the driving state is the state in which there is no possibility that the vehicle is rolled over as a result of determination that the driving state is the state in which there is no possibility that the vehicle is rolled over by comparing the detected yaw rate with the third predetermined threshold values.

7. A vehicular suspension rigidity controlling apparatus as claimed in claim 3, wherein the suspension rigidity adjusting section comprises at least one shock absorber in which a stroke state at an extension stroke is independently controllable by independently adjusting damping force characteristics at two stages of hard and soft or more and wherein, when the vehicular roll-over determining section predictively determines that there is a possibility that the vehicle is rolled over, the suspension controlling section sets one of the damping force characteristic of the shock absorber at the extension phase to be hard characteristic to augment the suspension rigidity of the suspension at the extension stroke and the damping force characteristic of the shock absorber at the compression phase to be soft characteristic to decrease the suspension rigidity of the suspension at the compression stroke to decrease the potential energy of the sprung mass of the vehicle.

8. A vehicular suspension rigidity controlling apparatus as claimed in claim 3, wherein the suspension rigidity adjusting section comprises each shock absorber in which a stroke state at an extension stroke is independently controllable by independently adjusting damping force characteristics at two stages of hard and soft or more and wherein, when the vehicular roll-over determining section predictively determines that there is a possibility that the vehicle is rolled over, the suspension controlling section sets one of the damping force characteristic of each shock absorber at the extension phase to be hard characteristic to augment the suspension rigidity of each suspension at the extension stroke and the damping force characteristic of each shock absorber at the compression phase to be soft characteristic to decrease the suspension rigidity of each suspension at the compression stroke to decrease the potential energy of the sprung mass of the vehicle.

9. A vehicular suspension rigidity controlling apparatus as claimed in claim 3, wherein the suspension rigidity adjusting section comprises the respective shock absorbers in each of which a stroke state at an extension stroke is independently controllable by independently adjusting damping force characteristics at two stages of hard and soft or more and wherein, when the vehicular roll-over determining section predictively determines that there is a possibility that the vehicle is rolled over, the suspension controlling section sets the damping force characteristics of the respective shock absorbers at the extension phase which are intervened between the vehicle body and inner wheels which are located at the inner side with respect to a cornering center to be hard characteristic to augment the suspension rigidities of the corresponding inner wheel side suspensions at the extension stroke and the damping force characteristics of the remaining shock absorbers at the compression phase which are intervened between the vehicle body and outer wheels which are located at an outside with respect to the cornering center to be soft characteristic to decrease the suspension rigidities of the remaining outer wheel side suspensions at the compression stroke to decrease the potential energy of the sprung mass of the vehicle.

10. A vehicular suspension rigidity controlling apparatus as claimed in claim 3, wherein the suspension rigidity adjusting section comprises at least one the shock absorber including a one-way rigidity switching mechanism which is switchable in a direction in which only the suspension rigidity at the extension stroke is increased by a frictional force of a frictional member and wherein the one-way rigidity switching mechanism comprises: a solenoid; a first biasing section; a second biasing section; and a piston rod, the frictional member being biased in a direction in which the frictional member is separated from the piston rod by the first biasing section when no power is supplied to the solenoid, the frictional member being biased in another direction in which the frictional member is contacted with the piston rod by the second biasing section with the biasing force of the first biasing section released when the power is supplied to the solenoid, the frictional member being formed in a wedge shape, the frictional member being acted upon in the direction for the frictional member to be contacted with the piston rod according to a biasing force of the second biasing section and a wedge effect of the frictional member when the power is supplied to the solenoid and the shock absorber is at the extension stroke, and the wedge effect of the frictional member being released against the biasing force of the second biasing section when the sho0ck absorber is at the compression stroke.

11. A vehicular suspension rigidity controlling apparatus as claimed in claim 3, wherein the suspension rigidity adjusting section comprises the shock absorbers each shock absorber including a one-way rigidity switching mechanism which is switchable in a direction in which only the suspension rigidities at the extension stroke is increased by a frictional force of a frictional member and wherein the one-way rigidity switching mechanism comprises: a solenoid; a first biasing section; a second biasing section; and a piston rod, the frictional member being biased in a direction in which the frictional member is separated from the piston rod by the first biasing section when no power is supplied to the solenoid, the frictional member being biased in another direction in which the frictional member is contacted with the piston rod by the second biasing section with the biasing force of the first biasing section released when the power is supplied to the solenoid, the frictional member being formed in a wedge shape, the frictional member being acted upon in the direction for the frictional member to be contacted with the piston rod according to a biasing force of the second biasing section and a wedge effect of the frictional member when the power is supplied to the solenoid and the shock absorber is at the extension stroke, and the wedge effect of the frictional member being released against the biasing force of the second biasing section when the sho0ck absorber is at the compression stroke.

12. A vehicular suspension rigidity controlling apparatus as claimed in claim 11, wherein, when the vehicular roll-over determining section predictively determines that there is a possibility that the vehicle is rolled over, the suspension controlling section outputs the power to the solenoid of the one-way rigidity switching mechanism.

13. A vehicular suspension rigidity controlling apparatus, comprising:

a plurality of suspensions, each suspension being intervened between a sprung mass of a vehicle body and an unsprung mass of a corresponding road wheel;

a suspension rigidity adjusting section that is enabled to adjust a rigidity of each suspension;

a driving state detecting section that detects a driving state of the vehicle including at least a vehicular velocity detecting section that detects a vehicular velocity and a steering angular velocity detecting section that detects a steering angular velocity;

a vehicular roll-over determining section that compares each of the detected vehicular velocity and the steering angular velocity with a corresponding one of predetermined threshold values to predictively determine whether the driving state of the vehicle is in the state in which there is a possibility that the vehicle is rolled over; and a suspension controlling section that, when the driving state of the vehicle is transferred from a first turning state to a second turning state which is reverse to the first turning state and the vehicular roll-over determining section predictively determines that the driving state of the vehicle is in the state in which there is a possibility that the vehicle is rolled over, adjustably controls rigidities of the respective suspensions via the suspension rigidity adjusting section in such a manner that one of the rigidities at at least compression stroke of the respective suspensions have been at the compression stroke during the first turning state being decreased and the rigidities at at least extension stroke of the remaining suspensions which have been at the compression stroke during the first turning state being increased is carried out to decrease a potential energy of the sprung mass of the vehicle.

14. A vehicular suspension rigidity controlling method, the vehicle comprising:

a plurality of suspensions, each suspension being intervened between a sprung mass of a vehicle body and an unsprung mass of a corresponding road wheel; and a suspension rigidity adjusting section that is enabled to adjust a rigidity of each suspension, and the method comprising:

detecting a driving state of the vehicle;

predictively determining whether the vehicular driving state is a state in which there is a possibility that the vehicle is rolled over from the detected driving state of the vehicle; and controllably adjusting the rigidity of at least one of the suspensions in a direction to decrease a potential energy of the sprung mass of the vehicle, when predictively determining that the vehicular driving state is the state that there is the possibility that the vehicle is rolled over.

* * * * *